J. DOAK.
Wheel-Cultivator.
No. 45,231. Patented Nov. 29, 1864.
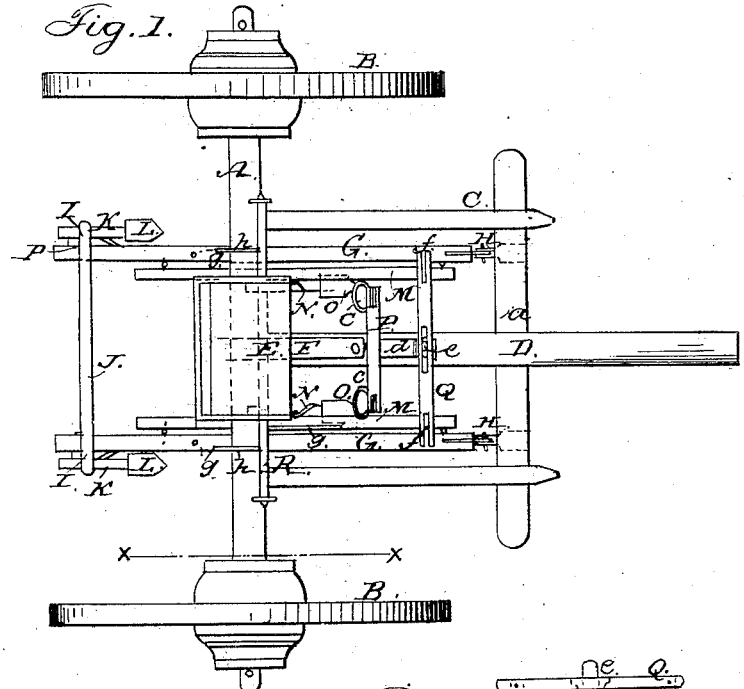
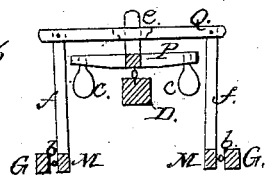
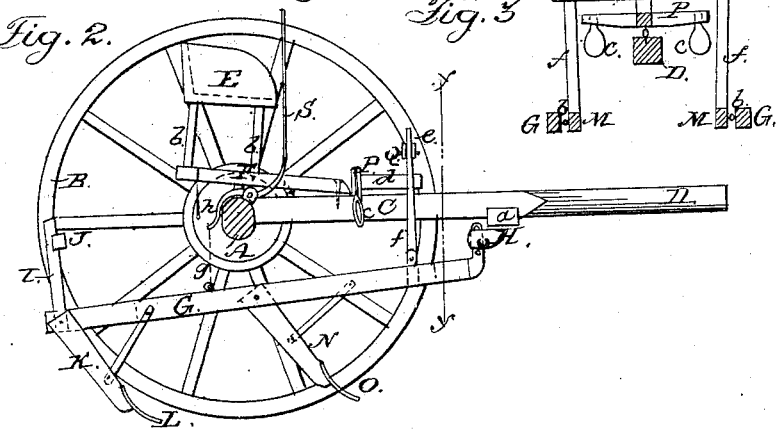
WITNESSES:
INVENTOR:

UNITED STATES PATENT OFFICE.

JOHN DOAK, OF KEITHSBURG, ILLINOIS.

IMPROVEMENT IN CULTIVATOR-PLOWS.

Specification forming part of Letters Patent No. 45,231, dated November 29, 1864.

*To all whom it may concern:*

Be it known that I, JOHN DOAK, of Keithsburg, in the county of Mercer and State of Illinois, have invented a new and Improved Cultivator-Plow; and I do hereby declare that the following is a full, clear, and exact description thereof, which will enable those skilled in the art to make and use the same, reference being had to the accompanying drawings, forming part of this specification, in which—

Figure 1 is a plan or top view of my invention. Fig. 2 is a side sectional view of the same, taken in the line $x\ x$, Fig. 1; Fig. 3, a diminished front view of the levers and treadles by which the plows are adjusted laterally, the draft-pole being in section, as indicated by the line $y\ y$, Fig. 2.

Similar letters of reference indicate corresponding parts.

This invention relates to a new and improved cultivator-plow of that class used for cultivating plants which are grown in hills and drills—such as corn, potatoes, &c.

The invention consists in a novel manner of arranging the plows, whereby the same may be operated laterally—that is to say, either to the right or left—with the greatest facility, so that the plows may be made to conform to the sinuosities of the rows of plants, and the latter prevented from being plowed out of the earth—a contingency of frequent occurrence in using those machines which do not admit of a ready lateral adjustment of the plows.

A represents an axle, and B B the wheels thereof.

C is a rectangular frame, which is attached to the front side of the axle A, and D is the draft-pole, the back end of which is framed centrally into the axle A, and is secured to the front cross-bar, $a$, of the frame C.

E is the driver's seat, which is placed on uprights $b$, the lower ends of which are attached to a base, F, which rests on the axle A and draft-pole D.

G G are two plow-beams, the front ends of which are connected by joints H H to the cross-bar $a$ of the frame C. The back ends of the beams G G have each an upright, I, attached to them, and the upper ends of these uprights are connected by a cross-bar, J. A standard, K, is also attached to the back end of each beam G, each standard having a plow, L, at its lower end of any proper form.

To the inner side of each plow-beam G there is attached by joints or hinges $b'$ a plow-beam M. The joints or hinges $b'$ admit of the beams M turning sidewise or in a lateral direction, and said beams M have each a standard, N, attached to them, having plows O at their lower ends. The lateral turning of the beams M admit of the plows O being adjusted or moved to the right or left, as may be required, in order to conform to the sinuosities of the rows of plants. The beams M are turned through the medium of a treadle, P, fitted on the draft-pole D, with a stirrup, $c$, at each end to receive the foot of the driver. This treadle has a short bar, $d$, framed centrally in its front side, said bar $d$ having an upright, $e$, at its outer end, which works in a mortise in a bar, Q, the ends of which are connected to uprights $f f$ at the front ends of the beams M M. Thus it will be seen that the plows O may be very readily moved by the driver either to the right or left, as may be required. The plows L do not require to be thus turned, as they operate at some distance from the rows of plants.

All of the plows are raised out of the ground, when necessary, by having the two beams G G connected by cords or chains $g\ g$ to arms $h\ h$, which project from a shaft, R, the bearings of which are on the axle A, said shaft having a lever, S, attached to it, which extends upward within convenient reach of the driver on the seat E.

I claim as new and desire to secure by Letters Patent—

Connecting together the beams G M by means of flexible connections or hinges $b'$, for the purpose of allowing the beams M to receive a lateral movement from the stirrups $c$ independently of the beams G, while both the beams G M may be moved vertically simultaneously by means of the lever S, substantially as set forth.

JOHN DOAK.

Witnesses:
JOHN A. J. BIRDSALL,
GEO. D. B. BIRDSALL.